April 1, 1969 G. N. DE LAMBALLERIE 3,435,663
DYNAMIC FILTER PRESS
Filed April 12, 1968 Sheet 3 of 3
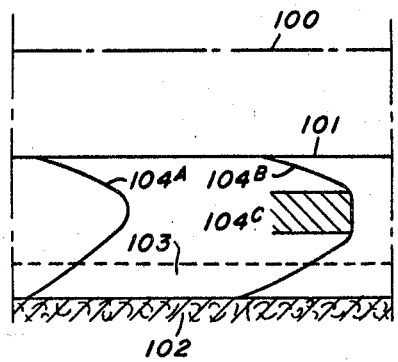
FIG. 3.
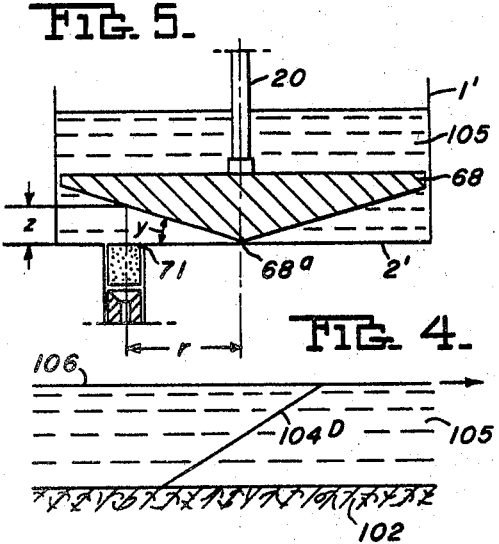
FIG. 5.
FIG. 4.
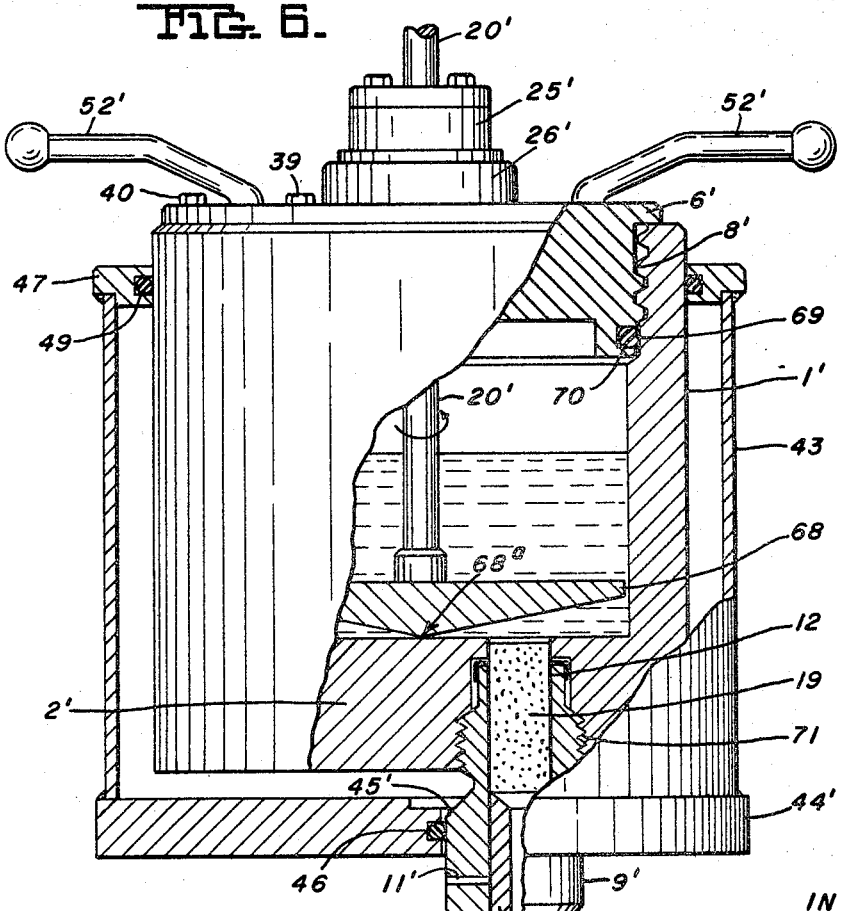
FIG. 6.
INVENTOR.
GUY NICOLAS de LAMBALLERIE
By Parmelee, Utzler & Walsh.
Attorneys

United States Patent Office 3,435,663
Patented Apr. 1, 1969

3,435,663
DYNAMIC FILTER PRESS
Guy Nicolas de Lamballerie, Salies-du-Salat, France, assignor to Entreprise de Recherches et d'Activites Petrolieres (E.R.A.P.), Paris, France
Continuation-in-part of application Ser. No. 540,251, Apr. 5, 1966. This application Apr. 12, 1968, Ser. No. 721,039
Claims priority, application France, Apr. 23, 1965, 14,391; Dec. 8, 1967, 131,521
Int. Cl. G01m 3/00
U.S. Cl. 73—38                                    11 Claims

ABSTRACT OF THE DISCLOSURE

A filter press to determine permeability of a ground sample. The sample is located in an outlet of a chamber in which drilling mud is placed. The entire unit is placed in a heated enclosure and brought to a desired temperature. Pressure is then applied to the sample to force the mud through the sample, while an agitator may be used to stir the mud. The volume of the fluid passing through the sample in a predetermined time is recorded. The permeability of the sample is then compared with the permeability of the sample before the plugging provoked by the mud.

Cross reference to related applications

The present application is a continuation-in-part of my copending application Ser. No. 540,251, filed Apr. 5, 1966.

Background of the invention

Experimental study of filtration on the natural ground by any type of fluid, including drilling fluids and completion fluids.

Known applicable prior art is found in U.S. Patents 2,705,418; 3,055,208 and 3,286,510.

Summary of the invention

The dynamic filter press of the invention provides means for simulating the temperature and differential of pressure conditions prevailing in the well to be drilled or reconditioned, and subjects a selected "ground sample" taken from the bore hole to such simulated conditions for a pre-selected time period. The ground sample is initially restored to its initial condition by draining with oil under suitable differential pressure and then measuring its permeability to such oil. Thereafter the ground sample is mounted in the press and subjected to suitable temperature and pressure conditions while measuring volume of fluid expelled from said sample in a given elapse time. Thereafter said sample is again drained with oil under the initial starting conditions until constant discharge is established. By measuring this latter permeability value with that originally recorded, permits determination of plugging provoked by the mud. Additionally, the depth of the damage may be approximately evaluated by forming the said sample of superposed slices of ground at different levels in the bore. Each slice may be evaluated individually as to its drop in permeability.

The object of the invention is to provide a filter-press of the character described which is simple to operate, requires a minimum of space, is relatively low in cost and can be conveyed to and operated in the vicinity of the drilling operation.

Description of the drawings

FIG. 3 is a drawing showing the speed profiles within the space between the drilling rod and the ground of Newtonian, Binghamian and pseudo-plastic liquids;

FIG. 4 is an analogous drawing showing the speed profile of flow between the fixed filter wall and a flat mobile wall parallel to the fixed wall;

FIG. 5 is a schematic section showing the principle of a cone agitator for the invention; and FIG. 6 is a side elevation of a modified form of the filter press of FIG. 1 embodying the cone agitator of FIG. 5.

Figure 1:
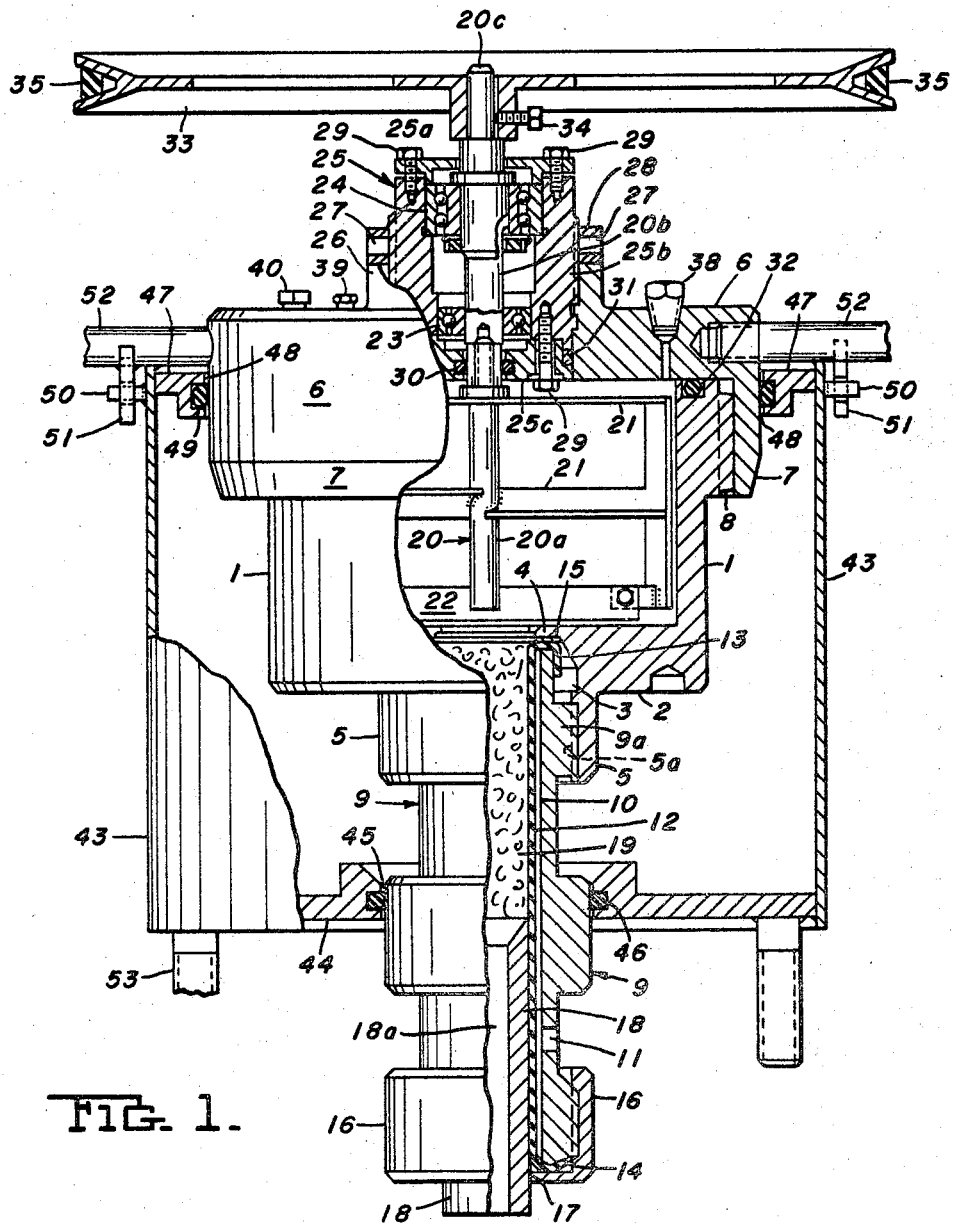
FIG. 1 of the drawing shows an elevation, partly in cross-section of one form of the invention.

Referring now in detail to the drawing, the press comprises a suitable cylindrical tank having side walls 1, closed by a bottom wall 2, of substantial thickness, which is provided with an opening 3 therethrough, whose upper end is preferably defined by an inturned annular flange 4. Depending from bottom wall 2 is an annular flange 5 enclosing the bottom face of opening 3 and provided with internal threads 5a for a purpose to be hereinafter described. A removable cover 6 is disposed over the cylindrical side walls 1 and provided with an annular depending flange 7 having internal thread engaging with external threads on the adjacent surface of the annular enlargement 8 of tank side walls 1.

A modified form of Hassler cell 9 has a threaded annular enlargement 9a whose threads are received in the internal threads 5a of annular flange 5. Cell 9 is an open-ended chamber provided with cylindrical bore 10 extending the length thereof, and one wall of the cell has an orifice 11 therein for a purpose hereinafter to be discussed. Within bore 10 is a flexible sleeve or cylindrical diaphragm 12 of suitable rubber and has its end edges 14, 15 folded down over the walls of cell 9, at the ends of the latter, in such manner that the diaphragm is normally in tension. These folded edges 14 and 15, are respectively pressed against the shoulder 4 of the bottom 2 of tank 1, preferably with the interposition of a flat sealing joint 15 and against a ring nut 16 which closes the bottom part of cell 9, but which has an axial bore 17 for the passage of a sleeve 18, which serves to support a sample 19 of the ground to be tested. Sleeve 18 is provided with an axially extending channel 18a for the passage of the filtrate, as hereinafter discussed.

Mounted upon and extending within tank 1 is a mud agitator comprised of a vertical shaft 20 to which are suitably attached, as by welding, blades 21 and a scraper 22. Shaft 20 turns on ball bearings 23, 24 in a vertically adjustable device 25 moveably mounted in a central boss 26 upon the top of tank cover 6. To facilitate this vertically adjustable movement, provision is made preferably for two cylindrical seatings 27 diametrically opposed upon a ring 28 welded to said device 25 and into which operating arms or levers can be introduced. For simplification in manufacture of device 25 it may, as shown, be comprised of three pieces, 25a, 25b, and 25c assembled together by screws 29. Toric joints 30, 31 assure tightness between device 25 and the shaft 20, as well as between the device 25 and the cover 6. A toric joint 32 assures the tightness between the upper edge of the tank 1 and the cover 6.

Figure 2:
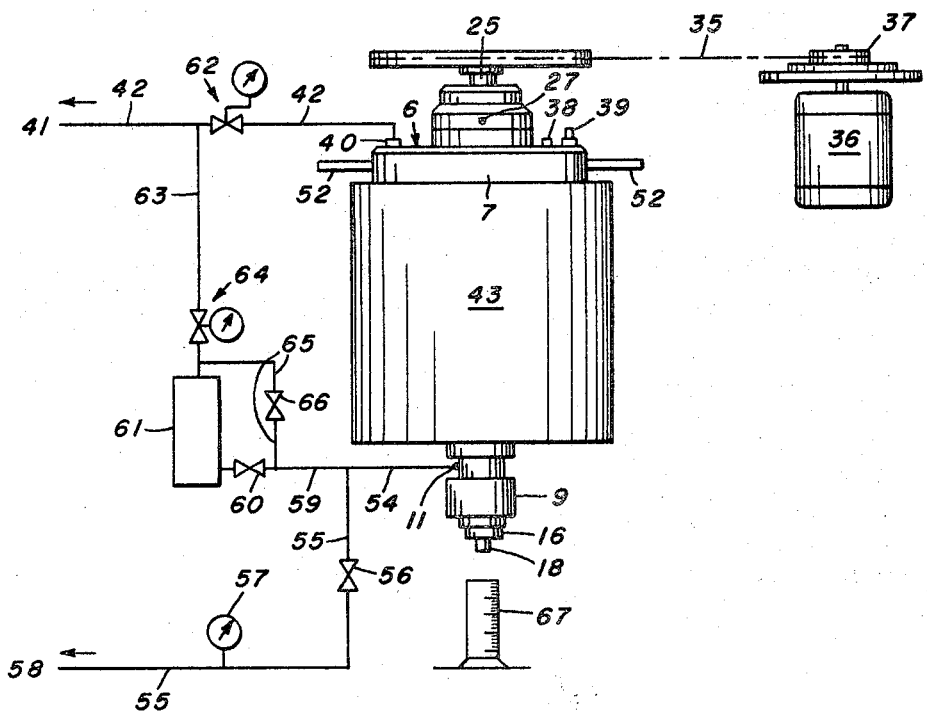
FIG. 2 shows a schematic view of FIG. 1 plus the operating appertances therefor.

To simplify its fabrication, the shaft 20 of the agitator is made up of two elements 20a and 20b screwed into one another as is shown in FIG. 1. The lower element 20a carries the blades 21 and the scraper 22, and the upper element 20b, which turns in the bearings 23, 24 ends at its upper part in a projection 20c to which a drive pulley 33 can be fixed that is removable by means of a screw 34. Over this pulley passes a belt 35 which connects it to a motor 36 (FIG. 2) through any one of the several pulleys 37 of different diameters (for example, three of these pulleys are represented in FIG. 2), by means of which several different speeds can be given to the shaft 20 for one constant speed of the motor 36.

The cover 6 is pierced by several orifices provided with pipe connections. One of them 38 is destined to receive a drain cock not shown. A second one 39 is destined to receive a device for measuring the temperature of the apparatus. A third one 40 is destined to connect the tank 1 with a source 41 of an inert gas under pressure, through a pipe line 42 represented schematically in FIG. 2.

To be able to bring the mud to be studied to a desired temperature corresponding to that prevailing in the well to be drilled or reconditioned, provision is made for a heating enclosure designated as a whole by 43. This enclosure is formed by an appreciably cylindrical container closed at its lower part by a welded bottom 44 pierced by a central opening 45 for the passage of the Hassler cell 9, with interposition of a toric sealing joint, 46. At its upper part the enclosure is closed by a circular cover 47 welded and pierced at its center by a large opening 48 for the passage of the cover 6, with interposition of a toric sealing joint 49. The enclosure 43 has welded to it two lateral diametrically opposed tenons 50 that can come into engagement with hooks 51 welded to two diametrically opposed tightening arms 52 screwed in the cover 6. Preferably, the direction of the hooks 51 is such that in order to engage said hooks with the tenons or lugs 50, it prevents the entire unit from turning in the same direction as the one provoking the screwing of the cover 6 to the flange 8 of the tank 1. In this way, after the cover has been screwed down on the tank with the aid of the arms 52, it is possible to introduce from top to bottom the tank 1, Hassler cell 9 assembly into the enclosure 43 and lock the whole into position. The enclosure 43 has at least one pipe connection 53 to introduce a heating liquid. The latter may either circulate, for example, through a thermosiphon from an external source of heat, or be heated by any other appropriate means, for example, by immersed electrical resistances, not shown, and joined up with an external source by means of "ad hoc" connections, or even by annular burners placed under the bottom 44 of the enclosure 43 and not shown either. A thermostat (not shown) assures preferably the maintenance of a constant temperature within the enclosure 43.

The installation according to the invention furthermore comprises hydraulic and pneumatic circuits. As is shown in FIG. 2, the intake 11 of the Hassler cell is connected by a pipe line system 54, 55, a valve 56 and a manometer 57 to a vacuum pump 58 (not shown), and through pipe lines 54, 59 and a valve 60 to a tank 61 for liquid, e.g. water. A pressure reducing valve 62 is interposed in the line 42 at a distance from the source of gas 41. The latter consists preferably of a bottle or cylinder with compressed nitrogen or other inert gas (not shown). A pipe line 63 connects the line 42 through a pressure reducing valve 64 to the tank 61. A pipe line 65 and a valve 66 constitute a derivation between the pressure reducing valve 64 and the pipe line 59. Finally, a test tube 67 is placed under the sleeve 18 to collect the filtrate.

The installation operates as follows: The ground sample 19 to be studied, after taken from the bore hole, is washed, dried and saturated in deposit water, and placed on the cell 9 and within the diaphragm 12. For rendering said placing more easy by outwardly expanding the diaphragm 12, a vacuum is first created around the diaphragm 12 with the aid of the pump 58 through the pipe lines 55 and 54 and the opening 11, the valve 56 being open. The pressure gauge 57 indicates the depression obtained. The ground sample 19 is then introduced in a manner so as to bring its upper face to the level of the central opening, with the smaller diameter, into the bore 3 of the bottom of the container 1. The vacuum is then cut off by closing the valve 56 and a pressure of gas or water is applied to the diaphragm 12. If a water pressure is desired, the valve 60 is opened and the desired pressure exerted in the tank 61 by bringing in nitrogen from the bottle 41 through the pipe lines 42 and 63, and the pressure reducing valve 64. The water of the tank 61 then arrives at the orifice 11 through the lines 59 and 54. If gas pressure is desired, the valve 60 is closed and the valve 66 opened. The nitrogen of the bottle 41 arrives then through the pipe lines 42, 63, 65, 59 and 54, and the open valve 66 at the pressure regulated by the pressure reducing valve 64. If it is desired to exert simply a pressure of ordinary air or of a gas other than the inert gas contained in the bottle 61, it will suffice to connect the pipe line 63 to this source instead of connecting it to the bottle 41.

Before subjecting the sample 19 to the action of the mud, it is necessary to "restore" it. This is done by draining the sample with oil under suitable differential pressure and thereafter measuring the permeability of this sample to the same oil. The examined mud is then poured into the container 1 and the agitator 20 to 22 adjusted to the desired level. The cover 6 is screwed on and the entire unit is placed into the heating enclosure. The whole is brought to the desired temperture, for example, by introducing water into the enclosure 43 through the pipe connection 53 and heating this water with the aid of immersed resistances. Once the desired temperature has been attained, the desired pressure is applied in the container 1 with the aid of the nitrogen bottle 41 by opening the pressure reducing valve 62. If necessary, the agitator can be started. The experience then begins. For its entire duration which varies, depending on the type of test effected, the operator records the volume of fluid expelled from the sample and collects it in the test tube 67 as a function of the elapsed time. After the filtration is completed, the sample 19 is drained with oil under the same conditions as at the start, till constant discharge is established. The comparison of the permeability value, that can then be measured, with the one that has been initially recorded, permits one to determine the plugging provoked by the mud. The depth of the damage can also be evaluated approximately by forming the sample from superposed slices of ground, whose drop in permeability is evaluated individually.

The above-described filter-press allows studying filtration under static conditions with the agitator stopped and this is particularly suitable for this type of testing. But the filtration could also be studied under dynamic conditions with the agitator in motion and the filtering conditions changed during testing by successive stopping and restarting of the agitator or even by varying its height position. Even the cake could be destroyed by sufficiently lowering the blade 22. However, under this last theory it is preferable to provide for a hard steel blade in place of blade 22 or below it, of length equal to the diameter of the sample and in contact with it. In this way the type of special filtration produced during drilling below and around the bit may then be simulated.

In reference to dynamic filtration through encountered permeable horizons, that is, filtration which meets the mud during its rising in the annular space between the set of drilling rods and the ground, it is also possible to simulate at least the same apparatus; for example, for a ground specimen of 33 mm. in diameter and with an agitator whose lower edge is 1 mm. of filter surface and whose speed is 400 t./mn., the calculation shows that the average rate of shear is 200 to 250$s^{-1}$ which is a true representation. However, this apparatus may be criticized due to the fact that the circulation speed of the mud and consequently the rate of shear vary at each point of the filter surface according to the distance from the point in relation to the axis of the apparatus. Plumb with this axis there is not even dynamic filtration in any exactness—the phenomena observed being a total phenomenon.

Following are some general observations concerning dynamic filtration. To reproduce in a laboratory the filtration process to which the drilling mud is subjected in the annular space between the set of drilling rods and the ground, it is advisable to precisely maintain the same flow operation of the fluid near the filter surface. It is particularly necessary that the rate of shear at the wall and in neighboring areas be maintained.

The flow of liquids, particularly the determination of speed profiles in the annular spaces, was the subject of numerous and often complex theoretical studies. It may be said however, that the problem is resolved in the case of laminary operation which deals with Newtonian liquids, Binghamian liquids or pseudo-plastic liquids.

Newtonian liquids are governed by the rheological equation:

$$\tau = \mu \frac{du}{dr}$$

where $\tau$ is the shear stress, $\mu$ is the viscosity and $du/dr$ is the rate of shear.

Binghamian liquids are governed by the rheological equation:

$\tau = \tau_y + \eta(du/dr)$, where $\tau_y$ is the critical shear stress and $\eta$ is the plastic viscosity.

Pseudo-plastic liquids are governed by the rheological equation:

$\tau = K(du/dr)n$, where K and $n$ are the rheological parameters.

Fortunately, it is accepted and calculations show that for usual drilling fluids (which are Newtonian, Binghamian and pseudo-plastic) the standard dimensions of the annular space between the drilling rods and the ground and the general adopted yield, the flow operation is actually laminar. The operation is certainly not similar near or about the drill tool but it is known that even in very turbulent flow, there is along the length of the wall a layer where the flow remains laminar. It is therefore in this latter type of operation that the applicant is particularly intrested.

It has been shown that the speed profiles in the annular spaces have the courses indicated in FIGURE 3 where 100 is the drill axis, 101 is the periphery of the drill rod, 102 is the bore wall, 103 is the limit of the constant rate of shear zone and 104A and 104B are the speed profils of a pseudo-plastic liquid (or Newtonian) and of a Binghamian liquid; the ruled part 104C corresponds to the zone where the rate of shear is equal to zero for a Binghamian fluid.

In applying the various processes which it is possible to find in literature for determining speed profiles in specific cases (corresponding to standard characteristics of mud, yields and dimensions of annular space) it is noted that from 5 to 10 mm. above and from the outside wall, the rate of shear is perceptibly constant. It is then easy to determine this and to specify the range in which it may be practically included. Calculations show that this range goes from some ten to several hundreds (3 to 5) to $s^{-1}$.

For example, in Binghamian drill mud with rheological characteristics:

$\tau_y$ (critical shear stress) $=8.5 g.f./100$ cm.$^2$, $\eta$ (plastic viscosity) $=38$ centipoises, circulating in an annular space between the wall of a drill hole of 16.5 cm. radius and a set of rods 8.9 cm. in radius at an average speed of 78.5 cm./sec., the calculation shows that the rate of shear at the filter wall is $190 s^{-1}$.

To simulate dynamic filtration in a laboratory, it is advisable to achieve a flow, of the fluid studied, which is expressed by similar rates of shear near the surface of the ground samples exposed to the action of the mud. The result is attained by placing parallel to the filter surface a propelled plane with proper speed which will keep the liquid going without sliding. If the space between the mobile plane and the fixed wall is slight (few millimeters) one can make an abstraction of the geometric difference (flat in one case, cylindrical in the other) and be content to reproduce all or part of the constant rate of shear zone. Since speed at the filter wall is of no value, the liquid displacement linear speeds are evidently also maintained. In FIGURE 4, 102 represents the filter wall, 104D is the speed profil, 105 is the mud and 106 the mobile plane.

In practice, to assure a better drive of the liquid streams without sliding in the filter press, it is desirable to replace the agitator type blade described in FIGURE 1 with a circular disk whose complete lower surface (parallel to the filter surface) causes the desired flow performance near the sample. The characteristics of this system will be fixed on one hand by the rotation speed of the disk and on the other hand by the distance separating the lower surface of the disk from the filter medium.

Finally, it appeared possible to extenuate the major inconveniences of the previously described device, that is, the rate of shear of the liquid varies at each point of the filter surface according to the distance from this point in relation to the axis of the apparatus. Therefore, it is advisable first to decenter the sample of ground studied, then turn to the principle of the viscosimeter called "cone-disk." As shown in the principal drawing of FIGURE 5, the element used for imposing the flow operation of the liquid is comprised of a cone 68 with a very large angle at the top whose point 68a rests on the bottom 2' of tank 1' of the apparatus. The rate of shear will be calculated at a small distance z from the filter surface and at a distance r from the rotation axis supposing that the rotation speed of the agitator is N t./minute and that the demi-angle at the top of the cone is equal to $$\frac{\pi}{2} - \varphi$$

if there is no sliding at the wall and if the distance $z$ is slight, the rate of shear is constant at this height and equal to:

speed on the agitator—speed on the sample
$$\overline{z}$$

that is $$\frac{2\pi N r s^{-1}}{60 z}$$

Since $z = r . \text{tg } \varphi$, the rate of shear is equal to $$\frac{2\pi N r}{60 r \cdot \text{tg } \varphi}$$

or $$\frac{\pi N s^{-1}}{30 \text{ tg } \varphi}$$

therefore independent of $r$.

In practice, if $\varphi$ is taken on the order of 6°; the result is tg $\varphi = 0.1$ and $$\text{the rate of shear} = \frac{\pi N s^{-1}}{3}$$

For a range of rotations going from some 10 to some 100 turns/minute all the useful ranges of rate of shear will then be covered.

The above calculation of the rate of shear assumes that the speed of the fluid on the sample or more exactly, on the filtration cake, is of no value. In fact, it involves an approximation because in any exactness, when the "dynamic" cake attained its equilibrium, it produced a certain "sliding at the wall." In fact, at this stage, the cake undergoes an erosion instantly compensated by a deposit of solid matter, a consequence of filtration. However, the speed of particles thus lifted off the surface is quite less than the average speed of the fluid. On the whole, the approximation only bears on the estimate of the value of the rate of shear, the simulation of the actual phenomenon, of course, not being altered.

In the cone agitator device described above it may be asked whether the mud directly affected by filtration—that is, the mud situated beneath the cone and subjected to a laminar flow system—always maintains sufficient homogeneity vis-à-vis the mud located above the cone and subjected indifferently to a turbulent area. In fact, experience shows that the discontinuity which the edge of the cone constitutes causes a turbulence near the edge of the tank which assures suitable stirring between the two compartments.

It will be noted that the fact of decentering the filter surface presents moreover the advantage of a possible increase in the number of samples of ground studied simultaneously.

On FIGURE 6, as also on FIGURE 5, the identical parts have the same reference numbers and the changed parts have the same reference numbers followed by the prime sign (').

In the modified apparatus in FIGURE 6 the cover 6' is screwed on a threading 8' located inside the tank 1' which is simply cylindrical, and not outside as in the construction of FIGURES 1 and 2 with simple interposition of a toric tightness coupling 69 placed in a groove 70 laid out in the periphery of cover 6'. A toric joint 49 placed in cover 47 of heating enclosure 43 assures as beforehand the tightness between tank 1' and the enclosure 43. The Hassler cell 9' is screwed directly on a decentered opening 71 of base 2' of tank 1', but it is also identical to that which has been described in FIGURES 1 and 2 and contains a diaphragm 12 of special rubber as well as a flange 18 which supports sample 19. It is mounted in a tight fashion in a decentered opening 45' of base 44' of the enclosure 43 by means of a toric joint 46 and is pierced by a vacuum and pressure extractor. The conical disk 68a constituting the agitator is positioned at the inside end of shaft 20' which turns in a device 25' mounted itself in a connection 26' of cover 6' and is driven in the above-described manner by a device not represented. Integral tightening handles 52' on the cover 6' allow this cover to be screwed on and off easily. The cover contains couplers 39, 40 for a thermometer and a connection for a source of inert gas under pressure and possibly a drain cock as described with reference to FIGURES 1 and 2.

The operation of the modified apparatus is a direct result of the above description so long as it differs (very little) from that of apparatus described with reference to FIGURES 1 and 2. It is therefore useless to describe it again.

The dynamic filter-press according to the invention, by reason of its conception, further more adapts itself particularly well to the following operations: measurement of the permeability to oil of the ground samples (the oil is then put into place in the container); study of the efficiency of the chemical stimulation treatments (such as acidification) or of the effectiveness of the plugging substances.

As indicated previously, the container 1 must be capable of resisting the corrosive action of the muds or liquids used, and it must furthermore resist pressures that may attain several tens of bars (for example, up to 60 or 80 bars).

It is understood, of course, that the embodiments described and represented have been done so only as examples and that they can undergo numerous modifications without departing from the scope of the invention.

In particular, one may provide the tank 1 or 1' with a drain placed at a suitable point of the bottom 2 or 2' and arrange in the cover 6 or 6' an additional pipe connection for filling the tank with a different fluid, or for its rinsing, without the necessity of unscrewing the cover and thus remove the heating enclosure 43. One may also simply withdraw the sample 19 and its supporting sleeve 18 without having to disassemble the apparatus in order to assure the draining and rinsing thereof. As previously stated, in the case of the modified apparatus shown in FIG. 6, one may provide several apertures such as 71 in the bottom 2' of the container 1' and 45' in the bottom 44' of the enclosure 43, and one may fit in said apertures several cells 9 each receiving a different sample of soil. There is also the possibility of a different execution of the agitator 20 to 22 and its vertical adjustment device 25 as well as its drive (e.g. with the aid of a variable speed motor keyed to the shaft 20 and connected thereto by a gear transmission). Finally, the assembly of the hydropneumatic system could itself also be replaced by an equivalent installation.

I claim:
1. A dynamic filter-press for selectively determining the filtration characteristics, in static and dynamic operation, on a sample of matter such as soil, of a fluid such as drilling mud from a drilling operation, comprising:
    (a) a hollow chamber having open opposite ends for enclosing an elongated flexible cylindrical diaphragm for reception of said sample,
    (b) means for selectively applying a positive and a negative force upon the outer surface of said diaphragm within said chamber,
    (c) means overlying and connected with the inlet end of said chamber for receiving said fluid and transmitting same to said sample within said diaphragm,
    (d) agitating means spaced from the sample and from said inlet within said fluid receiving means for imparting rotary motion to said fluid, and
    (e) means for selectively heating said fluid receiving means.

2. The filter-press as defined in claim 1, wherein said fluid receiving means is connected with means for selectively pressurizing the fluid therein.

3. The filter-press as defined in claim 1, wherein said agitating means is vertically adjustable relative to the inlet for the fluid passing to the said sample and to any cake which may be forming thereon.

4. An apparatus for determining the filtration characteristics in static and dynamic operation, on a cylindrical sample of matter, such as ground, of a fluid, such as a drilling mud, comprising:
    (a) an open-ended chamber adapted to receive a sample of porous material and provided with a conduit leading to the side wall thereof,
    (b) a flexible diaphragm within and extending over the opposite ends of said chamber,
    (c) a cylindrical container for reception of a drilling fluid to be studied and having an apertured bottom wall for registering with one end of said open-ended chamber,
    (d) means on said container bottom wall for engagement with and support of said open-ended chamber,
    (e) a top cover member for said cylindrical container having a central opening therethrough enclosed by annular upstanding flange portion and provided with peripheral means for attachment of the cover member to said cylindrical container,
    (f) mud agitator means mounted on said top cover member and extending through said top cover member into said cylindrical container for stirring the drilling fluid therein and above the sample of porous material disposed within said flexible sleeve,
    (g) a heating container for said assembled cylindrical enclosure and porous material sample receiving open-ended chamber, comprising an apertured bottom wall for passage of said open-ended chamber, an apertured top wall for passage of said cylindrical container and cylindrical side walls secured to said top and bottom walls, and means for introducing a heating means within said heating container.
    (h) means for selectively positioning a sample of porous material within said open-ended chamber and relative to said agitator means, (i) means associated with said open-ended chamber for selectively subjecting the flexible diaphragm therein to a controlled vacuum or compressive pressure, and (j) means for selectively driving said mud agitator means.

5. The filter-press as defined in claim 4, wherein the aperture of said apertured bottom wall is located centrally in said bottom wall.

6. The filter-press as defined in claim 4, wherein said mud agitator means comprises an inverted, large-angled cone member the apex of which practically contacts said apertured bottom wall, and wherein the aperture of said bottom wall is eccentrically located in said bottom wall.

7. In a dynamic filter-press for selectively determining the filtration characteristics, in static and dynamic operation, on a sample of matter such as soil, of a fluid such as drilling mud from a well drilling operation, comprising an open-ended chamber enclosing an elongated flexible open-ended cylindrical sleeve for reception of said sample, the improvement which comprises a cylindrical fluid-receiving container having an apertured bottom wall overlying and connected by said aperture with said chamber, agitating means adjustably mounted within said container, means for supporting said sample in such manner that the upper end of said sample lies flush with said aperture means, means for selectively heating said fluid-receiving container, means for selectively applying a positive and a negative force upon the outer surface of said sample-receiving sleeve within said chamber, and means for selectively pressurizing said fluid-receiving container.

8. The filter-press as defined in claim 7, wherein said agitating means is provided with a scraping blade for at least partly destroying the cake formed on the surface of said sample.

9. The filter-press as defined in claim 7, wherein said aperture in the bottom wall of the cylindrical fluid-receiving container is located centrally in said bottom wall.

10. The filter-press as defined in claim 7, wherein said agitating means comprises an inverted, large-angled cone, the apex of which practically contacts said bottom wall, of said cylindrical fluid-receiving container, and wherein said aperture is excentrically located in said bottom wall.

11. The filter-press as defined in claim 10, wherein there are several apertures excentrically located in said bottom wall and open-ended chambers enclosing elongated flexible open-ended cylindrical sleeves for reception of samples of a matter such as a soil fitted in each of said apertures.

References Cited

UNITED STATES PATENTS

| | | | |
|---|---|---|---|
| 2,705,418 | 4/1955 | Reichertz et al. | 73—38 |
| 3,055,208 | 9/1962 | Gallus | 73—61.4 XR |
| 3,258,117 | 6/1966 | Domeck, et al. | 73—38 |
| 3,286,510 | 11/1966 | Parker | 73—61.4 |

LOUIS R. PRINCE, *Primary Examiner.*

W. HENRY, *Assistant Examiner.*